(12) United States Patent
Aigner et al.

(10) Patent No.: US 12,168,312 B2
(45) Date of Patent: Dec. 17, 2024

(54) ARRANGEMENT FOR GRANULATING EXTRUDED MATERIAL

(71) Applicant: EREMA Engineering Recycling Maschinen und Anlagen Gesellschaft M.B.H., Ansfelden (AT)

(72) Inventors: Michael Aigner, Leonding (AT); Christian Wagner, Neumarkt im (AT); Roland Huber, St. Pantaleon (AT); Klaus Feichtinger, Linz (AT)

(73) Assignee: EREMA Engineering Recycling Maschinen und Anlagen Gesellschaft M.B.H., Ansfelden (AT)

( * ) Notice: Subject to any disclaimer, the term of this patent is extended or adjusted under 35 U.S.C. 154(b) by 387 days.

(21) Appl. No.: 17/602,172

(22) PCT Filed: Apr. 9, 2020

(86) PCT No.: PCT/AT2020/060142
§ 371 (c)(1),
(2) Date: Oct. 7, 2021

(87) PCT Pub. No.: WO2020/206476
PCT Pub. Date: Oct. 15, 2020

(65) Prior Publication Data
US 2022/0152876 A1     May 19, 2022

(30) Foreign Application Priority Data
Apr. 11, 2019 (AT) .............................. A 50329/2019

(51) Int. Cl.
*B29B 9/06* (2006.01)
*B29B 9/10* (2006.01)
(Continued)

(52) U.S. Cl.
CPC ................. *B29B 9/06* (2013.01); *B29B 9/10* (2013.01); *B29C 48/0022* (2019.02);
(Continued)

(58) Field of Classification Search
CPC .. B29B 9/06; B29B 9/10; B29B 7/582; B29B 9/02; B29C 48/0022; B29C 48/04; B29C 48/345; B65G 53/16
See application file for complete search history.

(56) References Cited

U.S. PATENT DOCUMENTS

2009/0134536 A1* 5/2009 Kojima ...................... B01J 2/02
                                                                  425/7
2016/0185012 A1  6/2016 Treffer et al.
2016/0243729 A1* 8/2016 Sommer ................ B29C 48/04

FOREIGN PATENT DOCUMENTS

CA      2552266 A1    7/2004
CN      1256994 A     6/2000
(Continued)

OTHER PUBLICATIONS

English translation of CN-203141679-U by EPO. (Year: 2013).*
(Continued)

*Primary Examiner* — Timothy Kennedy
*Assistant Examiner* — Inja Song
(74) *Attorney, Agent, or Firm* — Kilpatrick Townsend & Stockton LLP

(57) ABSTRACT

Disclosed is an arrangement for granulating polymer material, having a housing with a gas supply line, connected opposite the latter to the housing, having a rectangular cross-section, a granulating unit located at least partially in the housing and having a perforated plate of a feed or plasticising unit feeding into the housing, and a scraper which crushes or separates the material emerging through the recesses of the perforated plate, wherein in a plane
(Continued)

running parallel to the plane of the perforated plate, the two lateral wall surfaces of the gas discharge line perpendicular to this plane include an angle $\alpha 2$ with one another, and the two lateral wall surfaces of the gas supply line perpendicular to this plane include an angle $\alpha 1$, wherein the two angles $\alpha 1$, $\alpha 2$ open towards the housing and wherein the angle $\alpha 1$ is greater than the angle $\alpha 2$.

20 Claims, 6 Drawing Sheets

(51) Int. Cl.
*B29C 48/00* (2019.01)
*B29C 48/04* (2019.01)
*B29C 48/345* (2019.01)
*B65G 53/16* (2006.01)

(52) U.S. Cl.
CPC ............ *B29C 48/04* (2019.02); *B29C 48/345* (2019.02); *B65G 53/16* (2013.01)

(56) References Cited

FOREIGN PATENT DOCUMENTS

| | | | |
|---|---|---|---|
| CN | 101722586 A | | 6/2010 |
| CN | 201633144 U | | 11/2010 |
| CN | 103072219 A | | 5/2013 |
| CN | 203141679 U | * | 8/2013 |
| CN | 203739049 U | * | 7/2014 |
| CN | 203888063 U | | 10/2014 |
| CN | 104385478 A | * | 3/2015 |
| CN | 204183746 U | | 3/2015 |
| CN | 204977116 U | | 1/2016 |
| CN | 104385478 B | | 2/2017 |
| CN | 107553769 A | * | 1/2018 |
| CN | 208052337 U | | 11/2018 |
| CN | 208392388 U | | 1/2019 |
| EP | 0 664 192 A1 | | 7/1995 |
| EP | 2052825 A2 | * | 4/2009 ............... B29B 9/06 |
| EP | 3 043 973 B1 | | 11/2018 |
| JP | 2002-192138 A | | 7/2002 |
| JP | 2007-152770 A | | 6/2007 |
| KR | 2010-0026301 A | | 3/2010 |

OTHER PUBLICATIONS

English translation of EP-2052825-A2 by EPO. (Year: 2009).*
English translation of CN-107553769-A by EPO. (Year: 2018).*
English translation of CN-104385478-A by EPO. (Year: 2015).*
English translation of CN-203739049-U by EPO. (Year: 2014).*
Russian Office Action dated Aug. 9, 2023 in related Russian application (eight pages).
Japanese Office Action dated Nov. 30, 2023 in related Japanese application No. 2021-559879 (six pages).
India Office Action dated Feb. 13, 2023, 2023 in related India applicatio No. 202117040735 (ten pages).
Chinese Office Action dated Feb. 11, 2023 in related Chinese application No. 202080027874.X (16 pages).
Brazilian Office Action dated Apr. 9, 2020 in related Brazilian application No. BR112021016195-3 (four pages).
Taiwan Office Action dated Jun. 7, 2021 in related Taiwan application No. 11220554320 (twelve pages).
Notice of Transmission of the International Preliminary Report on Patentability in related International Application No. PCT/AT2020/060142 dated Jun. 22, 2021 (16 pages).
International Search Report mailed Jul. 1, 2020 in related International Application No. PCT/AT2020/060142 (six pages).

* cited by examiner

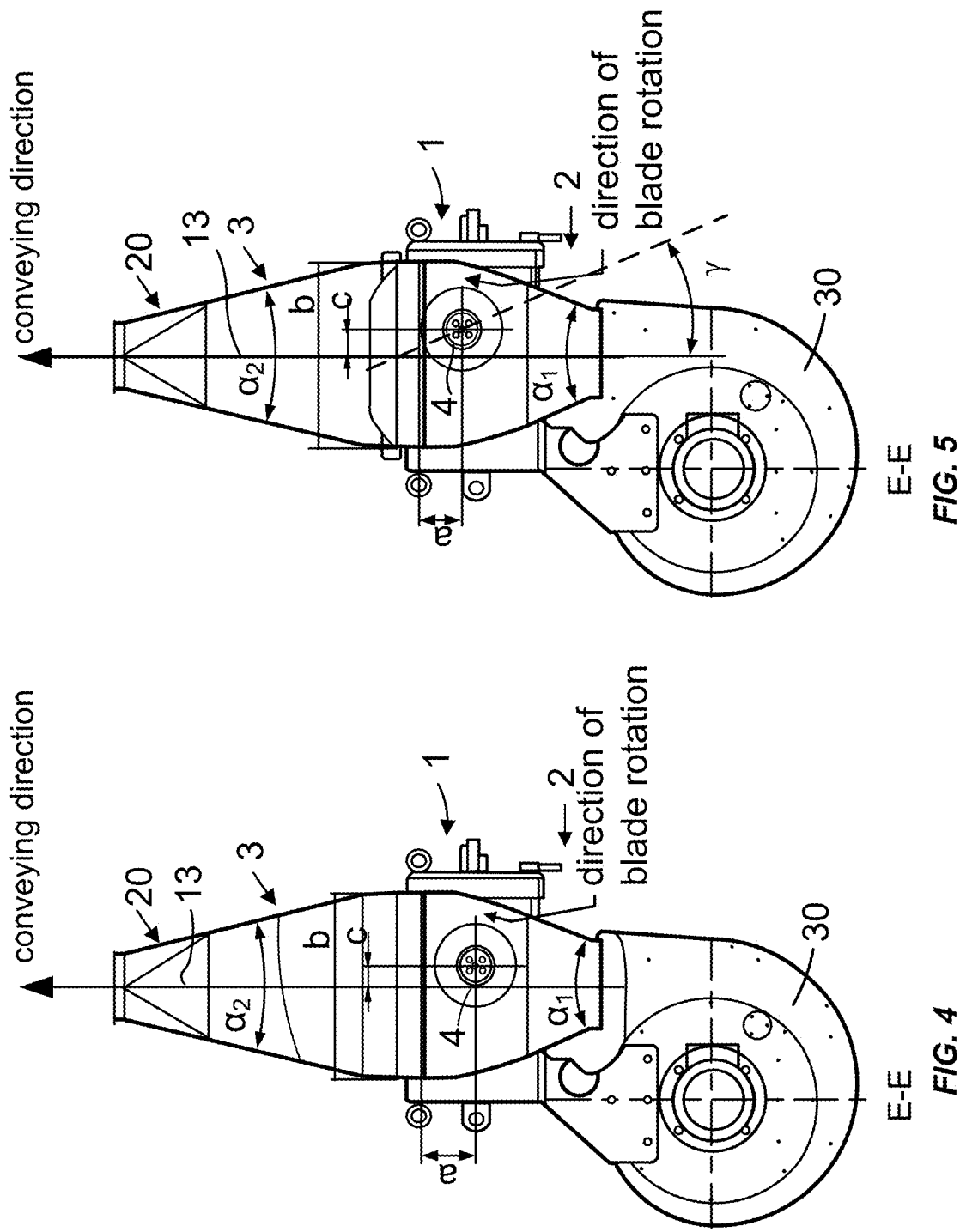

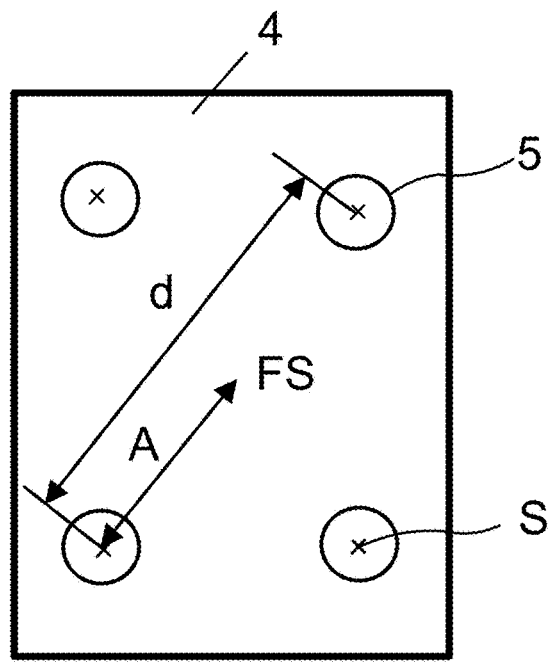
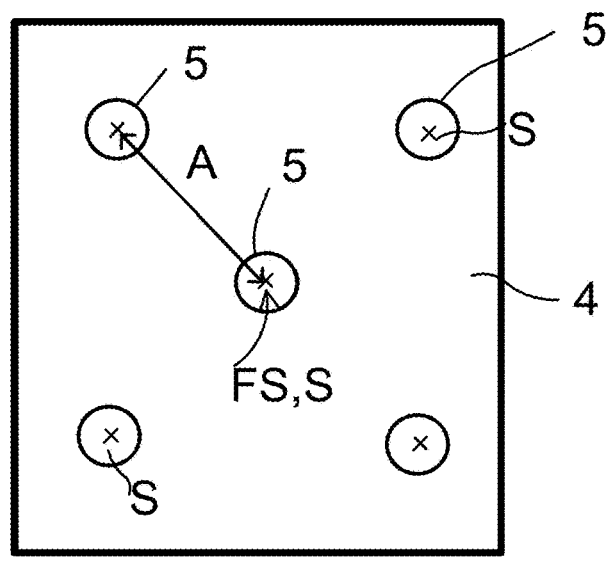
FIG. 8

ARRANGEMENT FOR GRANULATING EXTRUDED MATERIAL

BACKGROUND

The invention relates to an arrangement for granulating plasticised, or at least partially softened or at least partially melted, preferably extruded, material according to the generic term of patent claim 1.

Such arrangements are known, for example, from EP 2 052 825 A2. In this arrangement, the separation and discharge of the granulate particles coming from the extruder is not optimal and deposits also occur in the transport path.

BRIEF SUMMARY

The task of the present invention is to improve the granulation of plasticised materials, i.e. of softened, partially softened, partially melted to melted, thermoplastic or at least partially thermoplastic particles, preferably polymers.

The aim is mainly to solidify the separated particles as quickly as possible and thereby prevent both mutual collision of the particles and collision of the particles with the inner walls of the housing or the further conduits carrying away the particles.

This task is solved by the characterising features of patent claim 1.

According to the invention, it is provided that in a plane or sectional plane E-E running parallel to the plane of the perforated plate and/or the front wall of the housing, the two lateral wall surfaces of the gas discharge line perpendicular to this plane include an angle $\alpha 2$ with one another, and the two lateral wall surfaces of the gas supply line perpendicular to this plane include an angle $\alpha 1$, wherein the two angles open towards the housing and wherein the angle $\alpha 1$ is greater than the angle $\alpha 2$.

It has been shown that the desired effects can be achieved when the specific geometrical shapes and dimensions for the arrangement according to the invention are observed. This ensures that the particles can be carried along by the gas flow safely and without mutual interactions.

The formed strands of material coming from the feed or plasticising unit and exiting the perforated plate are cut to granulates in practical operation with scrapers, e.g. knives, shavers or the like. The scraper can be, e.g., an arrangement with one or more rotating knives which are mounted on a knife carrier and, as in the case according to the invention, are driven by a drive located outside the housing, e.g. an electric motor.

During separation, the strands of material or the separated particles are pressed into a specially shaped housing, wherein a gas flow is introduced into this housing from one side, advantageously from below. This gas flow is generated by means of a fan. The gas flow guided through the housing can consist of air, advantageously dried and/or cooled and/or tempered air, thus also of noble gases or reactive gases or gas mixtures of any kind.

A gas discharge line is connected to the housing, which is specially shaped to ensure both the complete removal of the formed granulates quickly and to keep the formed granulates separated and free of contact with each other. The gas flow is fed from one side of the perforated plate opening into the housing with the gas supply line and the gases are discharged or the particles are removed with a gas discharge line leading out in an opposite region of the housing. Furthermore, contact of the granulates with the walls of the housing or the inner walls of the housing is largely prevented or minimised in order to prevent deceleration and/or deposition of the granulate particles. Adhesion of the formed granulate particles to the wall is also avoided. However, it is essential above all that adhesion of the granulate particles to one another is prevented to the greatest possible extent according to the invention.

The extruded materials are transported by a medium, in particular a gas, which is passed through the arrangement. This gas can be any gas or gas mixture, in particular air is used. The gas flow used transports the particles out of the housing, wherein these material particles or granulates or sausages or the like are thereby cooled and/or solidified and/or chemically reacted out with the aid of the gas flow, e.g. by thermal influence, cooling or by a reaction initiated or induced by the gas.

The materials to be granulated, e.g. polymers, can be reinforced with fibres and/or also partially cross-linked. They can be based on polyesters, polyolefins or polyamides. In principle, it is possible to transport all at least partially plasticisable, preferably extrudable, materials, provided that they can be softened or melted and converted into particles or solidified accordingly, from the discharge point with the arrangement according to the invention and to treat them physically or chemically or to allow them to react or solidify during the transport away. The arrangement according to the invention can be used for all materials for which it is feasible to form strands into a granulate. These include doughs, ceramic masses, rubber, thermoplastic polyurethanes, silicones, etc.

Basically, it should be possible to achieve the solidification of the materials by the gas used, especially air. Evaporating media can also be used, such as water, when the solidification of the extruded materials to be formed into particles can be achieved by evaporation of water or such media. Evaporation may also take advantage of the cooling that occurs in the process, particularly when no significant condensation and no liquid phase become dominant.

The features of the dependent claims represent preferred further developments of the arrangement with particular technical effects:

A considerable improvement in granulation is achieved when, in a preferred embodiment of the invention, it is provided that in the plane parallel to the plane of the perforated plate or in the sectional plane, the spacing of the side walls of the housing, which are perpendicular to this plane, in their downstream end region and the mutual spacing of the lateral wall surfaces of the gas discharge line which adjoin them and are likewise perpendicular to this plane E-E has a value b of $10*d \geq b \geq 4*d$, preferably $8*d \geq b \geq 5*d$, wherein the value of d is calculated by determining the common surface centre of gravity for all existing recesses of the perforated plate, determining for each recess the spacing of the surface centre of gravity of the respective recess from the common surface centre of gravity, arithmetically averaging the spacing values determined for the existing recesses and fixing twice the value of the arithmetic mean as the value d.

In this context, it is particularly advantageous when the value b corresponds to the greatest mutual spacing of the side walls of the housing at their downstream end region and of the lateral wall surfaces of the gas discharge line at their upstream end region.

A preferred, flow-favourable embodiment provides that the two side wall surfaces of the gas discharge line, which are perpendicular to a plane perpendicular to the plane E-E or perpendicular to a plane perpendicular to the plane of the perforated plate, respectively, include an angle $\beta 2$ with each other, and the side wall surfaces of the gas supply line, which also extend perpendicular to a plane perpendicular to the plane E-E or perpendicular to a plane perpendicular to the perforated plate, respectively, include an angle β1 with each other, wherein the two angles β1, β2 open away from the housing, and wherein the angle β1 is greater than the angle β2.

It is further advantageous when the central axis of the feed or plasticising unit, preferably an extruder, and/or the common surface centre of gravity of all recesses present or the centre line of gravity of the perforated plate passing through the surface centre of gravity lies centrally with respect to the side walls of the housing and/or is situated in a plane of symmetry of the gas supply line and/or the gas discharge line and/or housing which is perpendicular to the plane of the perforated plate and contains the centre line of the housing. The position of the perforated plate in relation to the housing plays an important role in the transport behaviour of the arrangement.

The perforated plate with the recesses for the passage of the material to be granulated or a vertical centre line of the perforated plate running through the surface centre of gravity of the recesses of the perforated plate can be located in the centre of the housing or run through it. This centre lies centrally between the side walls of the housing or on a plane of symmetry perpendicular to the plane of the perforated plate and running through the housing in the direction of flow, which plane of symmetry contains the centre line of the housing. However, the centre can also be determined by the points of intersection of the respective surface diagonals of the front wall and rear wall of the housing.

For a number of applications, in particular for sticky materials, it has proven useful when the central axis of the feed or plasticising unit, preferably the extruder, and/or the common surface centre of gravity of all the recesses or the centre line of the perforated plate passing through it is laterally offset with respect to a centre line of the housing and/or a plane of symmetry of the gas supply line and/or the gas discharge line which is perpendicular to the plane of the perforated plate and contains the centre line of the housing and/or with respect to the centre between the side faces of the housing, wherein the lateral offset is by a value c, with c≤2.5*d, in the region of the housing in which the direction of rotation of the scraper and the direction of the gas flow run in the same direction. The perforated plate or its centre is thus offset in relation to the centre of the housing or the centre line of the housing. The offset is thus such that-viewed from the front surface of the housing towards the exit of the material from the perforated plate—there is a greater wall spacing in the region in which the rotating tools or blades of the scraper move against the main air flow. Cut-off particles get a momentum against the conveying direction and therefore become slower as they move against the conveying direction of the air. The danger of such particles hitting the housing wall is reduced by this measure.

Particularly sticky materials are materials for which, after the granulate particles have been separated, the cooling time in the gas flow, as used in practice, is not sufficient to significantly reduce the tendency of these granulate particles to stick. This considerably increases the risk of colliding granulate particles sticking to each other or building up on the inner wall of the housing. Therefore, in such cases, the perforated plate is not arranged centrally in the housing, but the perforated plate is offset relative to the longitudinal centre line or longitudinal 20 centre symmetry axis of the housing, thus forming a larger wall spacing in that region where the rotating blades of the scraper move against the direction of the gas flow.

For sticky materials in particular, it can also be advantageous when the central axis of the feed or plasticising unit, preferably an extruder, and/or the common surface centre of gravity of all the recesses present, or a centre line of the perforated plate running through it, is arranged at a spacing a upstream of the point or cross-sectional area of the housing at which-viewed in the direction of flow—the side walls of the widening housing have assumed the mutual spacing b, wherein a ≤1.1*d. In practice, it is assumed that the housing is fixed and the axis of the feed or plasticising unit moves relative to the housing. The perforated plate is displaced with the direction of flow in relation to the housing.

It has been found to be advantageous when, in a transit region from the housing to the gas discharge line, the housing and the gas discharge line have the same rectangular cross-sectional area, wherein the length of the longer side of the rectangle has the value b. This results in a vortex-free transition from the housing to the gas discharge line. In this context, it is also advantageous when the cross-sectional area of the housing in the transit region to the gas discharge line is only 5 to 20%, preferably 10 to 15%, larger than the cross-sectional area of the gas discharge line in its end region remote from the housing. Furthermore, it is advantageous to design the cross-sectional area of the housing at the height of the perforated plate to be 25 to 35% larger than the cross-sectional area of the gas supply line in its upstream end or its connection to the fan. This results in a largely vortex-free transport over the entire arrangement with a nozzle effect in the housing. It is also advantageous when the cross-sectional area of the housing increases by 10 to 20% from the height of the perforated plate to the transit region to the gas discharge line to form a diffuser.

In order to reduce the mutual contact of the granulate particles, it is advantageous when, in the plane parallel to the perforated plate, the opposite side wall surfaces of the housing have, at least over a partial region of their longitudinal extension, a convexly curved, in particular continuous, course diverging from the gas supply line to the gas discharge line, as seen from the interior of the housing. The transitions between the individual sections are advantageously formed in the form of round, arc-shaped elements, however, they can also be realised in a segmented design. In the case of segmentation, problems can arise with regard to the accumulation of dust and material in the corners and edges, even with small angles at the segment transitions. Furthermore, the quality of the airflow decreases in such regions, as undesirable turbulences can occur there.

It is preferred when the front wall and the rear wall of the housing are aligned parallel to each other and/or parallel to the plane of the perforated plate. The parallel wall sections through which the gas flows in the housing improve the removal of the separated particles in the direction of the gas discharge line or the nozzle effect.

A simple construction of the application according to the invention results when the scraper has a drive shaft which runs in the housing from the rear wall of the housing to the perforated plate located in the region of the front wall of the housing and representing the end region of the feed or plasticising unit, preferably the extruder. A flow-favourable connection to units for further processing or treatment of the granulate particles results when a transition part is connected to the gas discharge line, which transition part changes the rectangular cross-section of the gas discharge line into a cross-section with a round or curved circumference, wherein the transition part has wall sections tapering downstream, which in particular are connected at the same angle α2 or angle β2 to the lateral wall surfaces or side wall surfaces of the gas discharge line or extend them, in particular in the form of triangles. An advantageous structure of the arrangements with regard to particle transport and prevention of their sticking together results when the apex of the angles α1, α2 and/or β1, β2 lies on the centre line or a longitudinal plane of symmetry through the gas supply line, the housing and the gas discharge line.

It has proven to be favourable for particle transport when the angle α2 is 0.25 times to 0.75 times, preferably 0.4 times to 0.6 times, the angle α1. Sticking together of the particles is reduced when the angle α1 is <180°, preferably in the region of 15° to 110° and in particular an acute angle of 20° to 60°, and/or when the angle α2 is <180° and in particular an acute angle, preferably in the region of 3.0° to 82.5°, in particular from 6° to 36°.

It is further favourable for particle transport when the angle β2 is 0.12 times to 0.45 times, preferably 0.2 times to 0.3 times, the angle β1.

In order to further reduce the sticking together of the particles, it is advantageous when the angle β1 is <180° and in particular an acute angle, preferably in the region from 18° to 80°, in particular from 20° to 50°, and/or when the angle β2 is <180° and in particular an acute angle, preferably in the region from 8° to 40°, in particular from 4° to 15°.

It is space-saving and advantageous for industrial application when the gas supply line, the housing and the gas discharge line are arranged vertically one above the other.

BRIEF DESCRIPTION OF THE DRAWINGS

The invention is illustrated below by way of example in preferred embodiments which are not to be understood as restrictive.

FIGS. 4 and 5 show different embodiments concerning the position of the arrangement in relation to the extruder shaft r a perforated plate of the extruder, respectively.

FIG. 8 shows a sketch for determining the value b.

DETAILED DESCRIPTION

Figure 1:
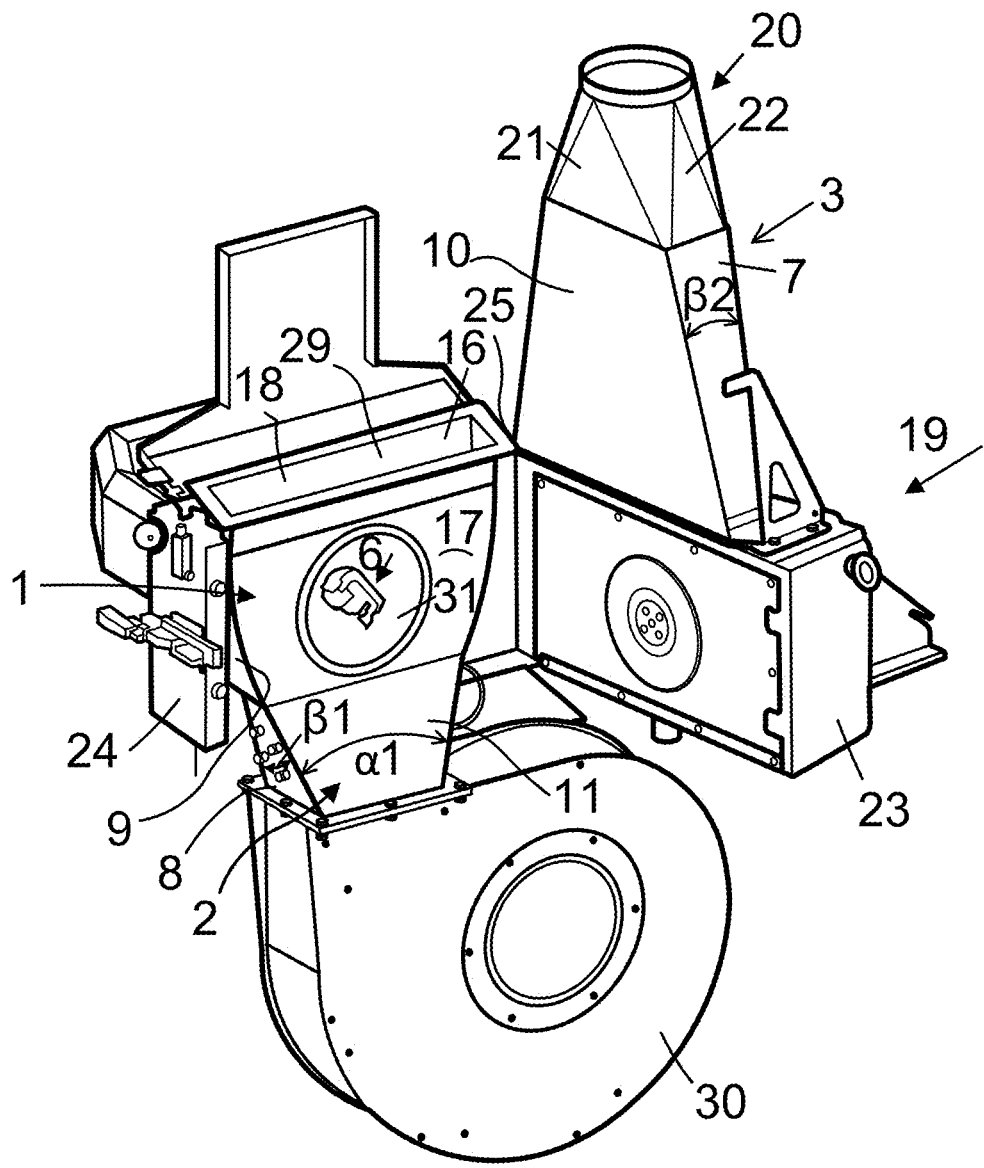
FIG. 1 shows a perspective view of the arrangement according to the invention, wherein the right-hand part of the figure shows the part of the arrangement connected to the feed or plasticising unit, preferably an extruder, on which the fan part of the arrangement according to the invention shown on the left is pivotably mounted.
Figure 3:
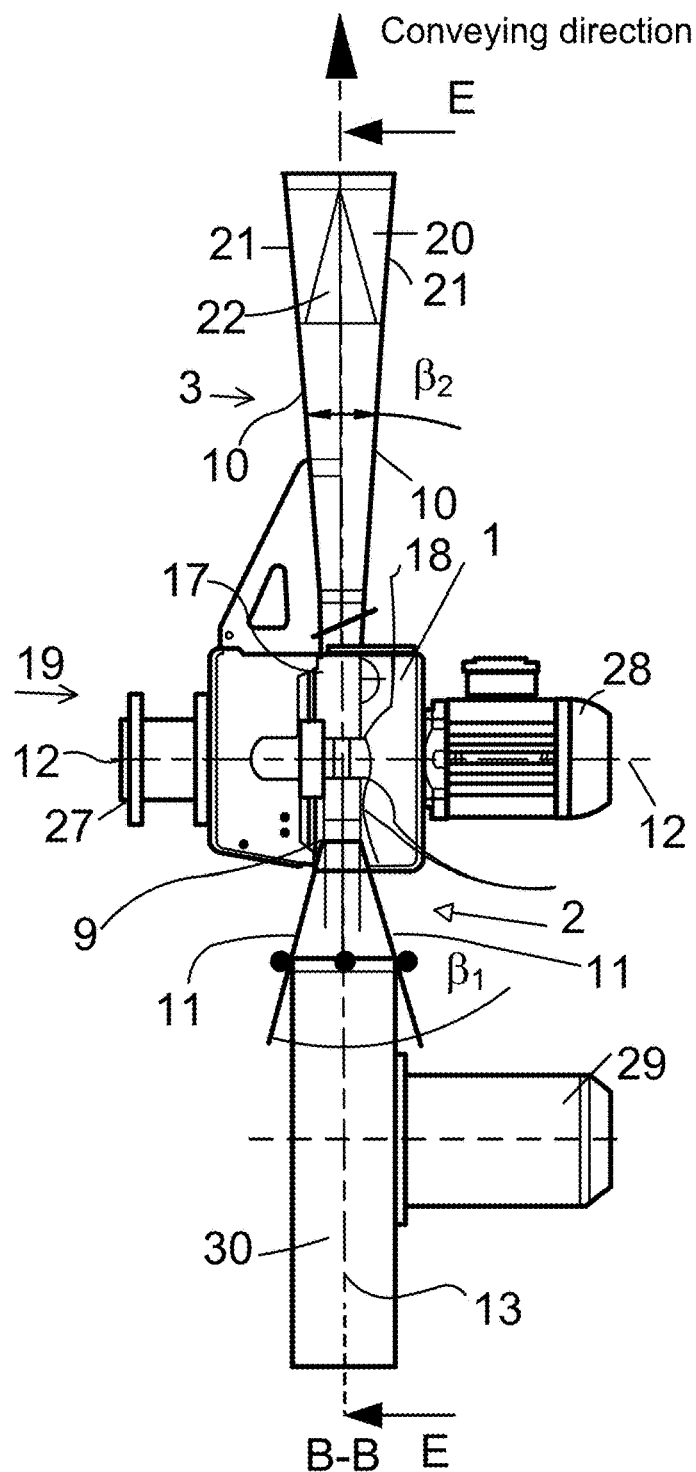
FIG. 3 shows a section B-B according to FIG. 2.

The arrangement according to the invention is arranged downstream of or connected to any feed or plasticising unit 27, preferably an extruder, wherein the unit 27 is shown with its end region or end part only in FIG. 3. The end region, as shown in FIG. 1, is received by or connected to a box-shaped support part 23 of a housing 1 and is closed off with a perforated plate 4 for the material outlet, which opens into the housing 1. The conveying direction of the unit 27 is shown schematically with an arrow 19. Such a unit can also be formed by a pressure line conveying plasticised and/or molten material.

As FIG. 1 shows, between a gas supply line 2 and a gas discharge line 3 lies the housing 1, the front wall 17 and rear wall 18 of which run parallel to each other. The perforated plate 4 opens into the housing 1 and the drive shaft of a scraper 6 projects therein. The drive shaft of the scraper 6 is driven by a motor 28.

As shown in FIG. 1, a support part 24 is pivotably mounted on the support part 23 by means of a pivot bearing 25 which can be designed as desired, which in turn supports the motor 28 and the scraper 6 driven by the motor 28 via a drive shaft. The scraper 6 comes into contact with the perforated plate 4 when the support part 24 is swivelled onto the support part 23, in order to scrape off the material exiting through the perforated plate 4. In this way, granulate particles are formed in the housing 1 while simultaneously being transported away with a gas flow.

The pivot bearing 25 for the support parts 23, 24 is provided to allow easy maintenance work inside the housing 1 or to gain access to the scraper 6 and the perforated plate 4.

The support part 23 carries in its upper region a gas discharge line 3 in the form of a tapering tube or channel with four edges running in the direction of flow or a rectangular cross-sectional area, which is adjoined by a transition part 20 with wall sections 21, 22 ending in a rounded cross-section. The wall sections 21 and 22 each have the same inclination as the side wall surfaces 7 or 10 respectively of the gas discharge line 3.

When the support part 24 is swivelled in, the housing 1 located on the support part 24 comes to lie with its upper opening cross-section 29 below the cross-sectional area of the gas discharge line 3 adapted to this opening cross-section, so that gas can flow into the housing 1 from below by means of a fan 30 via a gas supply line 2 and can be conducted via the housing 1 into the gas discharge line 3, wherein the gas flows past the perforated plate 4 and the scraper 6. The perforated plate 4 opens tightly in front of or into an opening 31 in the front wall 17 of the housing 1. The perforated plate 4 can also project into the housing 1. In this way, the strands of material exiting the perforated plate 4 can be separated from the scraper 6 and carried along directly by the gas flow.

The gas supply line 2 leading to the housing 1 is connected to the fan 30. As can be seen from FIG. 2, the lateral wall surfaces 8 of the gas supply line 2, which run perpendicular to the plane of the perforated plate 4 or to a sectional plane E-E or to the front wall 17 and rear wall 18 of the housing 1, are inclined at an angle α1 to one another, wherein the apex S of this angle α1 lies on the centre line between these two wall surfaces 8 or on the centre line 13 of the housing 1 or on a longitudinal axis of symmetry of the housing 1. The apex S of the angle α1 can be at the level of the axis of the rotor of the fan 30.

The two wall surfaces 8 are adjoined by the side walls 9 of the housing 1, which diverge downstream and are slightly convexly curved when viewed from the inside, preferably at least over a partial region. In the downstream end region of the housing 1, the housing 1 has an extension or spacing b between the side walls 9. The gas discharge line 3 adjoins this end region of the housing 1, the lateral wall surfaces 7 of which include an angle α2 with each other, the apex of which lies downstream of the housing 1. It can be seen that the angle α1 is larger than the angle α2.

FIG. 3 shows that in the case of the gas supply line 2 adjoining the fan 30, the two side wall surfaces 11 perpendicular to a plane perpendicular to the sectional plane E-E or to the plane of the perforated plate 4 include an angle β1 which is greater than the angle β2 formed by the two side wall surfaces 10 of the gas discharge line 3, which are also perpendicular to this plane E-E. The apex of the angle β1 lies downstream of the gas discharge line 2, preferably in the housing 1. The apex of the angle β2 lies upstream of the gas discharge line 3, preferably upstream of the housing 1, in particular in the gas supply line 2 or upstream of the gas supply line 2.

In operation, the fan 30 is driven by the fan motor 28 and conveys a gas flow via the gas supply line 2 into the housing 1, which gas flow removes the granulate particles separated by the scraper 6 on the perforated plate 4 from the housing 1 and carries them along into the gas discharge line 3. These particles in the form of granulates, sausages or irregularly shaped bodies can be solidified with the help of the gas flow. This solidification can take place by a thermal influence, e.g. cooling or drying effect of the gas flow, or also by chemical reactions induced by the gas flow itself.

The angles α1, α2 and, in an advantageous embodiment, β1, β2 between the respective wall surfaces of the gas supply line 2 and the gas discharge line 3 are important for the safe, rapid and, if possible, collision- and deposit-free transport of the particles. The values b and d as well as the expansion or widening of the housing 1 from the perforated plate 4 downstream are also advantageous for deposit-free particle agglomeration.

The cross-section or the cross-sectional area of the housing 1 in its downstream end region shows a spacing b between the lateral wall surfaces 9 which is in relation to a value d characteristic of the perforated plate 4. This value d is determined by the position, shape and number of recesses 5, which determine the cross-section of the material to be granulated. Since the perforated plates 4 used in practice for different materials may have irregularly distributed and/or unequally sized and/or unequally shaped and/or have a different number of recesses 5, the value d is determined in the following way: The common surface centre of gravity FS for all existing recesses 5 is determined. Furthermore, the spacing A of the surface centre of gravity S of the respective recess 5 from the common surface centre of gravity FS is determined for each recess 5. The values for the spacing A determined for all recesses 5 present are arithmetically averaged. The double value of the arithmetic mean then corresponds to the value d. FIG. 8 explains this procedure for determining the value d in more detail. Four recesses 5 are arranged in a perforated plate 4, each at the corner points of an imaginary rectangle. Each of these recesses has its surface centre of gravity S as its centre, since the recesses are circular. The common surface centre of gravity of the four recesses 5 lies in the centre of these four recesses 5 and is designated FS. The spacing between this common surface centre of gravity FS and the individual recesses 5 is designated A. The spacing A is the same for each of the four recesses 5, so that the sum to be formed for the arithmetic mean is 4*A. After determining the arithmetic mean, which has the value A, the resulting value is therefore d=2*A. This type of determination can also be used without further ado for recesses 5 having an elliptical cross-section or for circular arrangements 5. In the case of irregularly shaped recesses 5 or recesses with different shapes, the surface centre of gravity S of each recess must be determined and the common surface centre of gravity FS can then be determined from the sum of the individual surface centres of gravity S.

FIGS. 4 and 5 show perforated plates 4 recesses 5 of which are arranged at the corners of a square, wherein a further recess 5 lies at the diagonal intersection of this square. The value d is thus the length of the diagonal of this square, at the corners of which the centres or surface centres of gravity of the circular recesses 5 are located. FIG. 8 below shows this arrangement of recesses 5 more clearly.

Figure 2:
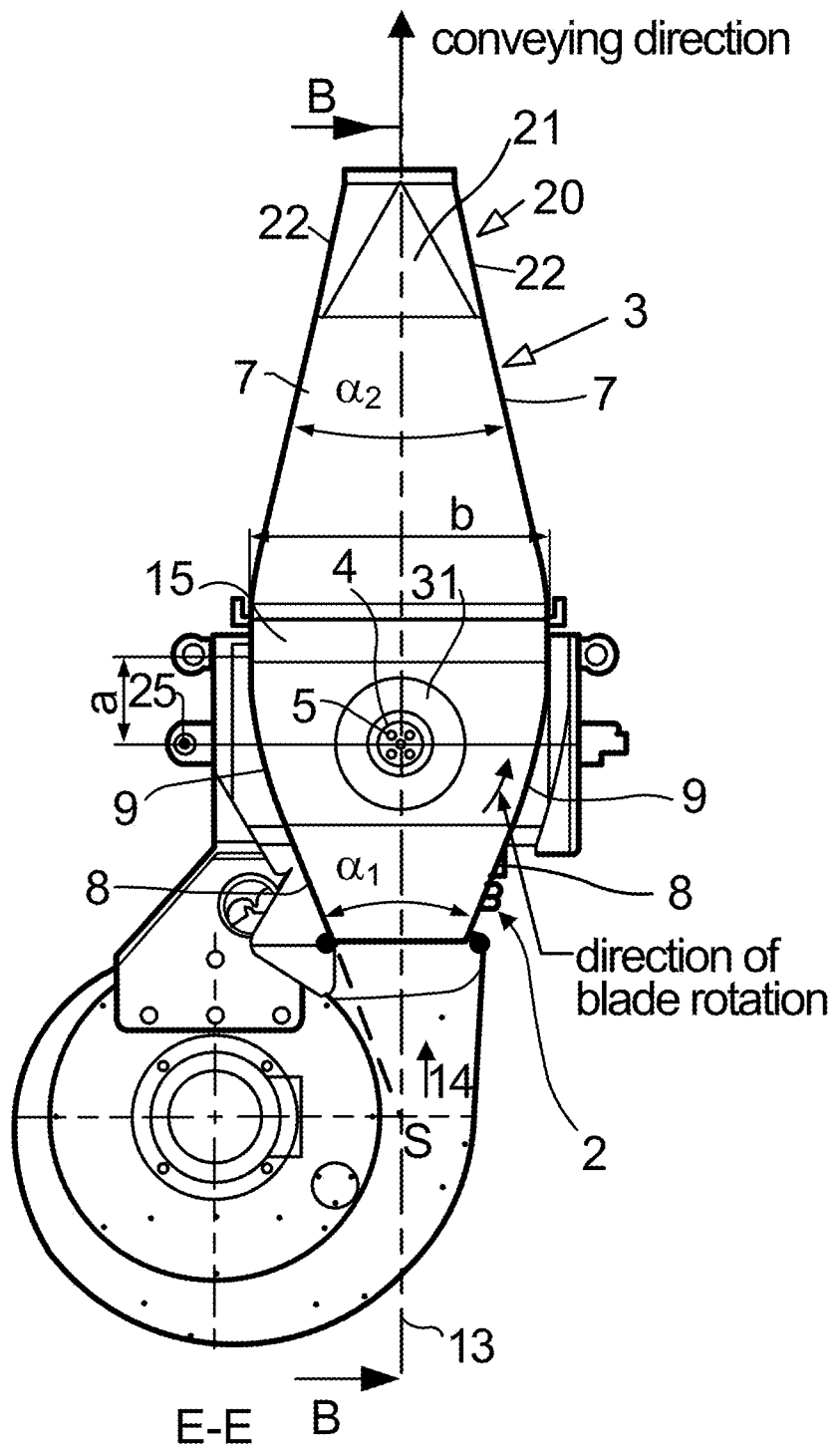
FIG. 2 shows a sectional view E-E of the arrangement according to FIG. 3, wherein the direction of view is in the direction of the extruder connected to the arrangement.

In the embodiment shown in FIGS. 1 and 2, the axis of the end part of the feed or plasticising unit 27 or the extruder axis and the centre line 12 of the perforated plate 4, which passes through the common surface centre of gravity FS and is perpendicular to the plane of the perforated plate 4, intersect the centre line 13 of the housing 1, which runs in the longitudinal direction. For sticky materials, however, it may prove advantageous when an off-centre offset of the perforated plate 4 or its centre line 12 takes place relative or laterally to this centre line 13. Particularly in the case of highly sticky materials, there is a risk that separated particles will collide with each other or come into contact with the inner wall surface of the housing 1 and adhere to each other or build up on the housing 1 and obstruct the passage.

It has proved advantageous when—as shown in FIGS. 4 and 5—the centre line 12 of the perforated plate 4 or the axis of the feed or plasticising unit 27 or the surface centre of gravity FS of the perforated plate 4 is offset laterally by an amount c relative to the centre line 13 of the housing 1. This offset takes place horizontally or transversely to the direction of flow in a plane parallel to the perforated plate 4 and, if necessary, can also take place vertically or in or against the direction of flow.

The maximum lateral offset c depends on the value of d, wherein it has proven to be extremely favourable in practice when it is provided that c is ≤2,5*d. The value of c is selected depending on the material and particle size and is adjustable.

Upstream or vertically downstream, an offset by a value a ≤2.2*d can take place. At most, this results in an offset vector that is inclined, e.g. at an angle γ to the longitudinal centre line 13, as can be seen in FIG. 5.

The lateral offset is advantageously in the direction in which the direction of rotation of the scraper 6 and the direction of flow of the gas flow through the housing 1 are in the same direction.

Preferably, the axis of the feed or plasticising unit 27 and the centre line 12 of the perforated plate 4 coincide. The common surface centre of gravity FS advantageously lies on this axis or centre line 12 of the perforated plate 4.

Figure 6:
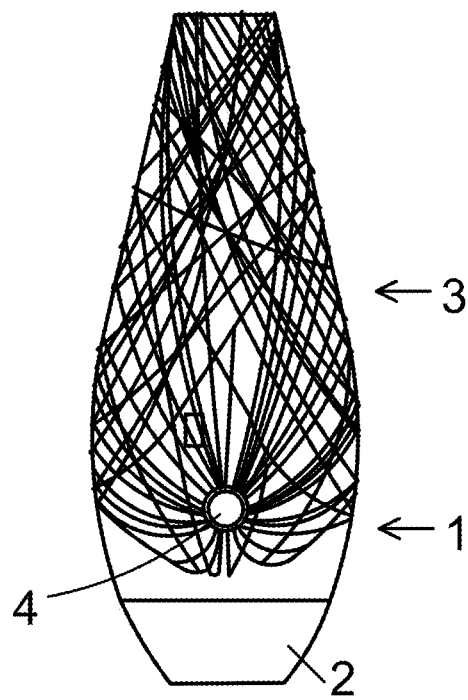
FIGS. 6 and 7 show diagrams.

FIG. 6 shows paths of the granulate particles exiting through the perforated plate 4 and separated by the scraper 6 in the housing 1 and in the gas discharge line 3. It can be seen that the particles are either immediately conveyed downstream or, after a fairly short movement caused by the scraper, are carried along by the gas flow against the direction of flow of the gas flow. It can also be seen that most of the particle paths run unbroken, i.e. without collisions with the inner wall of the housing or the inner wall of the gas line. Particularly in the region immediately adjacent to the exit of the granulate particles on the perforated plate 4, and which is important for the drying of the particles, very few particle collisions can be detected. The individual separated granulate particles follow independent trajectories and collisions with other granulate particles are almost non-existent.

Figure 7:
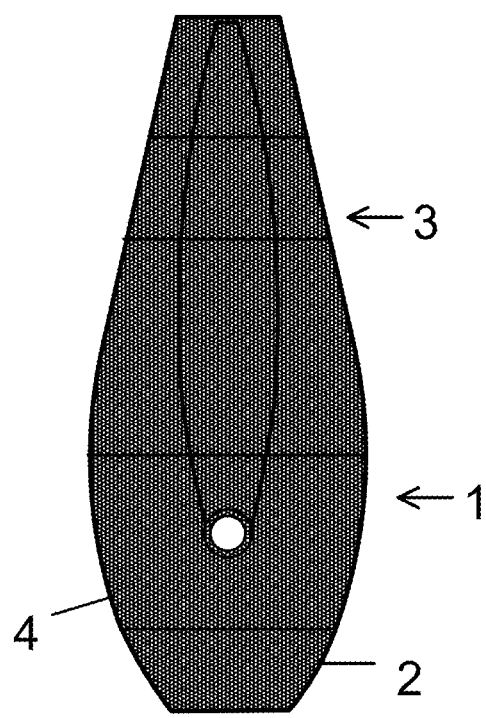

FIG. 7 shows a velocity profile over a longitudinal sectional area of the housing 1 and the gas discharge line 3 parallel to the perforated plate 4. It can be seen that the velocity profile of the particles increases abruptly from the outside to the inside, and that in particular in the central region of the gas flow there is a strikingly high flow velocity compared to the peripheral regions. This means, especially considering FIG. 6, that considerably fewer or no particles are transported in the peripheral regions, but only in the central region of the gas flow. Thus, wall collisions are largely avoided.

The invention claimed is:

1. Arrangement for granulating plasticised or at least partially softened or at least partially melted polymer material, comprising a housing (1) with a gas supply line (2) having a rectangular cross-section and a gas discharge line (3), connected opposite the gas supply line (2) to the housing (1), having a rectangular cross-section, a granulating unit located at least partially in the housing (1) and having a perforated plate (4) of a feed or plasticising unit (27) which feeds or opens into the housing (1), and a scraper (6) which crushes or separates the material emerging through recesses (5) of the perforated plate (4), characterised in that, in a plane extending parallel to a plane of the perforated plate (4) and/or a front wall (17) of the housing (1) or a sectional plane (E-E) extending parallel to the plane of the perforated plate (4) and/or the front wall (17) of the housing (1), two lateral wall surfaces (7) of the gas discharge line (3), which are perpendicular to either the plane or the sectional plane, include an angle $\alpha 2$ with one another, and two lateral wall surfaces (8) of the gas supply line (2), which are perpendicular to either the plane or the sectional plane, include an angle $\alpha 1$, wherein the two angles $\alpha 1$, $\alpha 2$ open towards the housing (1) and wherein the angle $\alpha 1$ is greater than the angle $\alpha 2$.

2. The arrangement according to claim 1, characterized in that in at least one of the sectional plane (E-E) or the plane extending parallel to the plane of the perforated plate (4), spacing of side walls (9) of the housing (1), which are perpendicular to the at least one of the sectional plane (E-E) or the plane extending parallel to the plane of the perforated plate (4), in their downstream end region, and a mutual spacing of the lateral wall surfaces (7) of the gas discharge line (3), which are adjacent thereto and are likewise perpendicular to the sectional plane (E-E), have a value b of 10*d>b>4*d, wherein the value of d being calculated by determining the common surface centre of gravity (FS) for all the recesses (5) present in the perforated plate (4), determining for each recess (5) of all the recesses the spacing of the surface centre of gravity(S) of the respective recess (5) from the common surface centre of gravity (FS), arithmetically averaging the spacing values (A) determined for the recesses (5) present and fixing twice the value of the arithmetic mean as the value d.

3. The arrangement according to claim 1, characterised in that a value b corresponds to the greatest spacing between side walls (9) of the housing (1) at their downstream end region and at the lateral wall surfaces (7) of the gas discharge line (3) at their upstream end region.

4. The arrangement according to claim 1, characterized in that two side wall surfaces (10) of the gas discharge line (3), which are perpendicular to a plane perpendicular to the sectional plane (E-E) or perpendicular to a plane perpendicular to the plane of the perforated plate (4), include an angle 32 with each other, and two side wall surfaces (11) of the gas supply line (2), which also extend perpendicular to the plane perpendicular to the sectional plane (E-E) or perpendicular the plane perpendicular to the perforated plate (4), include an angle $\beta 1$ with each other, wherein the two angles $\beta 1$, $\beta 2$ open away from the housing (1) and wherein the angle $\beta 1$ is greater than the angle $\beta 2$.

5. The arrangement according to claim 4, characterised in that a transition part (20) is connected to the gas discharge line (3), wherein the former transitions the rectangular cross-section of the gas discharge line (3) into a cross-section with a round or curved circumference, wherein the transition part (20) has wall sections (21, 22) tapering downstream, which are connected and inclined at the same angle $\alpha 2$ or the same angle $\beta 2$ to the lateral wall surfaces (7) or side wall surfaces (10) of the gas discharge line (3) or extend these in the form of triangles.

6. The arrangement according to claim 4, characterized in that the apex(S) of each of the angles $\alpha 1$, $\alpha 2$ and/or $\beta 1$, $\beta 2$ lies on the centre line (13) of the housing or a longitudinal plane of symmetry through the gas supply line (2), the housing (1) and the gas discharge line (3).

7. The arrangement according to claim 4, characterized in that the angle $\beta 2$ is 0.12 times to 0.45 times the angle $\beta 1$.

8. The arrangement according to claim 4, characterized in that the angle $\beta 1$ is <180° and is an acute angle in the range from 20° to 50°, and/or that the angle $\beta 2$ is <180° and is an acute angle, in the range from 4° to 15°.

9. The arrangement according to claim 1, characterized in that a central axis of the feed or plasticising unit (27), and/or a common surface centre of gravity (FS) of all the recesses (5) or a centre line (12) of the perforated plate (4) running through the common surface centre of gravity (FS) lies centrally with respect to side walls (9) of the housing (1) and/or is located in a plane of symmetry of the gas supply line (2) and/or of the gas discharge line (3) and/or of the housing (1), wherein gas supply line (2) and/or of the gas discharge line (3) and/or of the housing (1) are perpendicular to the plane of the perforated plate (4) and contains a centre line (13) of the housing (1).

10. The arrangement according to claim 1, characterized in that a central axis of the feed or plasticising unit (27), and/or a common surface centre of gravity (FS) of all the recesses (5) or a centre line (12) of the perforated plate (4) running through the common surface centre of gravity is laterally offset with respect to a centre line (13) of the housing (1) and/or with respect to a plane of symmetry of the gas supply line (2) and/or of the gas discharge line (3), wherein gas supply line (2) and/or of the gas discharge line (3) are perpendicular to the plane of the perforated plate (4) and contains the centre line (13) of the housing and/or with respect to the centre between side surfaces (9) of the housing (1), wherein the lateral offset is by a value c, with c<2.5*d, in a region of the housing (1) in which a direction of rotation of the scraper (6) and a direction (14) of gas flow are in the same direction, wherein the value of d being calculated by determining the common surface centre of gravity (FS) for all the recesses (5) present in the perforated plate (4), determining for each recess (5) of all the recesses the spacing of the surface centre of gravity(S) of the respective recess (5) from the common surface centre of gravity (FS), arithmetically averaging the spacing values (A) determined for the recesses (5) present and fixing twice the value of the arithmetic mean as the value d.

11. The arrangement according to claim 1, characterised in that a central axis of the feed or plasticising unit (27), and/or the common surface centre of gravity (FS) of all the recesses (5) or a centre line (12) of the perforated plate (4) running through the common surface center of gravity, is positioned opposite a point or cross-sectional area of the housing (1), at which—viewed in the direction of flow—side walls (9) of a widening housing have assumed a mutual spacing b, is arranged upstream at a spacing a, wherein a ≤1.1*d, wherein the value of d being calculated by determining the common surface centre of gravity (FS) for all the recesses (5) present in the perforated plate (4), determining for each recess (5) of all the recesses the spacing of the surface centre of gravity (S) of the respective recess (5) from the common surface centre of gravity (FS), arithmetically averaging the spacing values (A) determined for the recesses (5) present and fixing twice the value of the arithmetic mean as the value d.

12. The arrangement according to claim 1, characterized in that in a transition region (15) from the housing (1) to the gas discharge line (3) the housing (1) and the gas discharge line (3) have the same rectangular cross-sectional area (16), wherein the length of the longer rectangular side has a value b, wherein the value b corresponds to the greatest spacing between side walls (9) of the housing (1) at their downstream end region and at the lateral wall surfaces (7) of the gas discharge line (3) at their upstream end region.

13. The arrangement according to claim 1, characterized in
that a cross-sectional area of the housing (1) in a transition region to the gas discharge line (3) is only 5 to 20% larger than a cross-sectional area of the gas discharge line (3) in its end region remote from the housing, and/or
that a cross-sectional area of the housing (1) at a location of the perforated plate (4) is 25 to 35% larger than a cross-sectional area of the gas supply line (2) in its upstream end or its connection to a fan (30), and/or
that a cross-sectional area of the housing (1) increases by 10 to 20% from the location of the perforated plate (4) to the transition region to the gas discharge line (3) to form a diffuser.

14. The arrangement according to claim 1, characterised in that in the sectional plane (E-E) parallel to the perforated plate (4) opposing side wall surfaces (9) of the housing (1) have, at least over a partial region of their longitudinal extent, a convexly curved course diverging from the gas supply line (2) towards the gas discharge line (3) as seen from an interior of the housing (1).

15. The arrangement according to claim 1, characterized in that a front wall (17) and a rear wall (18) of the housing (1) are aligned parallel to one another and/or parallel to the plane of the perforated plate (4).

16. The arrangement according to claim 1, characterised in that the scraper (6) has a drive shaft which runs in the housing (1) from a rear wall (18) of the housing (1) to the perforated plate (4) located in a region of the front wall (17) of the housing (1) and constituting an end region of the feed or plasticising unit (27).

17. The arrangement according to claim 1, characterized in that the angle $\alpha 2$ is 0.25 times to 0.75 times the angle $\alpha 1$.

18. The arrangement according to claim 1, characterized in
that the angle $\alpha 1$ is <180° and is an acute angle of 20° to 60°, and/or
that the angle $\alpha 2$ is <180° and is in the range from 6° to 36°.

19. The arrangement according to claim 1, characterized in that the gas supply line (2), the housing (1) and the gas discharge line (3) are arranged vertically one above the other.

20. The arrangement according to claim 1, characterized in that a centre line (12) of the perforated plate (4) and a central axis of the feed or plasticising unit (27) coincide.

* * * * *